United States Patent [19]
Skarbo et al.

[11] Patent Number: 5,835,089
[45] Date of Patent: Nov. 10, 1998

[54] APPLICATION PROGRAMMING INTERFACE FOR SHARED ADDRESS BOOK SERVICES IN A COMPUTER SYSTEM

[75] Inventors: Rune A. Skarbo, Hillsboro; John D. Elliott, Aloha, both of Oreg.

[73] Assignee: Intel Corporation, Santa Clara, Calif.

[21] Appl. No.: 735,318

[22] Filed: Oct. 25, 1996

Related U.S. Application Data

[63] Continuation of Ser. No. 312,317, Sep. 26, 1994, abandoned.

[51] Int. Cl.$^6$ .................................................. G06F 15/00
[52] U.S. Cl. ...................... 345/335; 345/346; 345/350; 395/682; 395/683; 395/200.75
[58] Field of Search ..................................... 395/326, 350, 395/335, 346, 339, 200.02, 200.03, 200.08, 200.09, 200.16, 680, 682, 683, 200.75

[56] References Cited

U.S. PATENT DOCUMENTS

| | | | |
|---|---|---|---|
| 5,333,266 | 7/1994 | Boaz et al. ......................... | 395/200.36 |
| 5,416,901 | 5/1995 | Torres ................................. | 395/335 X |
| 5,491,783 | 2/1996 | Douglas et al. .................... | 395/335 |
| 5,491,784 | 2/1996 | Douglas et al. .................... | 395/352 |
| 5,500,859 | 3/1996 | Sharma et al. ..................... | 370/468 |
| 5,500,929 | 3/1996 | Dickinson .......................... | 395/356 |
| 5,530,740 | 6/1996 | Irribarren et al. .................. | 379/89 |
| 5,557,659 | 9/1996 | Hyde-Thomson .................. | 379/88 |

*Primary Examiner*—Mark R. Powell
*Assistant Examiner*—Crescelle N. dela Torre
*Attorney, Agent, or Firm*—Blakely, Sokoloff, Taylor & Zafman

[57] ABSTRACT

An application programmers interface for shared address book services in a computer system that provides a register function call that enables a set of client communication application programs executing on the computer system to each register a callback function. The application programmers interface also provides a notify function call that enables an address book application program executing on the computer system to notify the appropriate client communication application program via the appropriate callback function that a user has selected a destination identifier for the corresponding communication type.

21 Claims, 6 Drawing Sheets

APPLICATION PROGRAMMING INTERFACE FOR SHARED ADDRESS BOOK SERVICES IN A COMPUTER SYSTEM

This is a continuation of application Ser. No. 08/312,317, filed Sep. 26, 1994, now abandoned.

BACKGROUND OF THE INVENTION

1. Field of the Invention:

The present invention pertains to the field of computer systems. More particularly, this invention relates to an application programmers interface that enables shared address book services for multiple communication application programs.

2. Background:

Prior computer systems commonly implement a variety of hardware mechanisms that enable remote communication. For example, such communication hardware mechanisms may include a data modem that enables data communications via a telephone line and a communication network interface that enables transfer of electronic mail (e-mail) messages over a local area network (LAN). Such a computer system may also include a high speed communication line interface that enables real time video communication for a video conferencing system.

In addition, prior computer systems typically implement a variety of communication application programs that employ such hardware communication mechanisms. For example, such a prior computer system typically implements a fax or fax-modem application program that performs fax and data communication via the hardware data modem. Such a prior computer system may also include an electronic mail application program that enables the transfer of e-mail messages and files over the local area network through the hardware network interface. In addition, such a computer system may implement a video conferencing application program that performs video data transfer through the high speed communication line interface.

Such communication application programs typically require a user to specify one or more destination identifiers for transfer of communication data or messages. A fax application program typically requires the user to specify a telephone/fax number for a fax transmission. Similarly, a typical e-mail application program requires a user to specify an e-mail address for outbound messages. In addition, a typical video conferencing application requires a user to specify a destination address on the high speed communication line for transmission of outbound video data. For example, such a video conferencing application program may require the user to specify an industry standard data network (ISDN) address for video conferencing over an ISDN communication link.

Prior communication application programs typically implement an address book service that enables the user to store recipient names and corresponding destination information in an address book database. Typically, such an address book service maps recipient names into destination identifiers such as telephone numbers and e-mail addresses. In addition, such an address book service of a communication application program usually enables the user to search an address book database for a recipient name or destination name and retrieve the corresponding destination identifiers. For example, an address book service in a typical fax application program enables the user to store and retrieve fax numbers and associated recipient or destination names. A typical e-mail application program enables the user to store and retrieve e-mail LAN addresses associated with recipient names.

In prior computer systems, each communication application program installed typically maintains a separate private address book. For example, a fax application program usually maintains a fax number address book while an e-mail application program maintains a separate e-mail address book.

Unfortunately, such separate address books typically require the user to enter the same information in multiple address book databases. For example, a particular recipient may have both a fax destination and an e-mail destination. In such prior systems, the user must typically enter the recipient name and associated information in the private address book for the fax application program as well as the private address book for the e-mail application program. Such a duplication of information among multiple private address books usually increases the amount of computer system storage space required by databases for communication application programs.

Moreover, such systems that require multiple private address books are usually difficult to maintain because changes to recipient information typically requires that the user change the same information in multiple address book databases. In addition, such systems typically require a user to learn several address book user interfaces. As a consequence, such systems typically occupy increased system resources and require increased maintenance for similar information maintained by multiple communication application programs.

SUMMARY AND OBJECTS OF THE INVENTION

One object of the present invention is to provide shared address book services in a computer system.

Another object of the present invention is to provide an application programmers interface for shared address book services in a computer system.

Another object of the present invention is to provide shared address book services for multiple communication application programs in a computer system.

A further object of the present invention is to reduce the storage area required by address book databases for communication application programs.

Another object of the present invention is to simplify the maintenance of address book information for communication application programs.

Another object of the present invention is to enable a common address book application program to inform the appropriate communication application program upon user selection of information and user initiated commands in an address book.

These and other objects of the invention are provided by an application programmers interface for shared address book services in a computer system. The application programmers interface specifies a call for a register function that enables a set of client communication application programs executing on the computer system to each register a callback function. Each client communication application program maps to one or more communication types. The application programmers interface also specifies a notify function call that enables an address book application program executing on the computer system to notify the appropriate client communication application program according to the communication type that a user has selected a corresponding destination identifier. The notify function call invokes the callback function of the appropriate client communication application program according to the communication type. The register function calls from the client communication application programs specify the communication types for the communication application programs, and a mechanism is provided for default communication application programs for each communication type in case a client communication application program is not running on the computer system.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
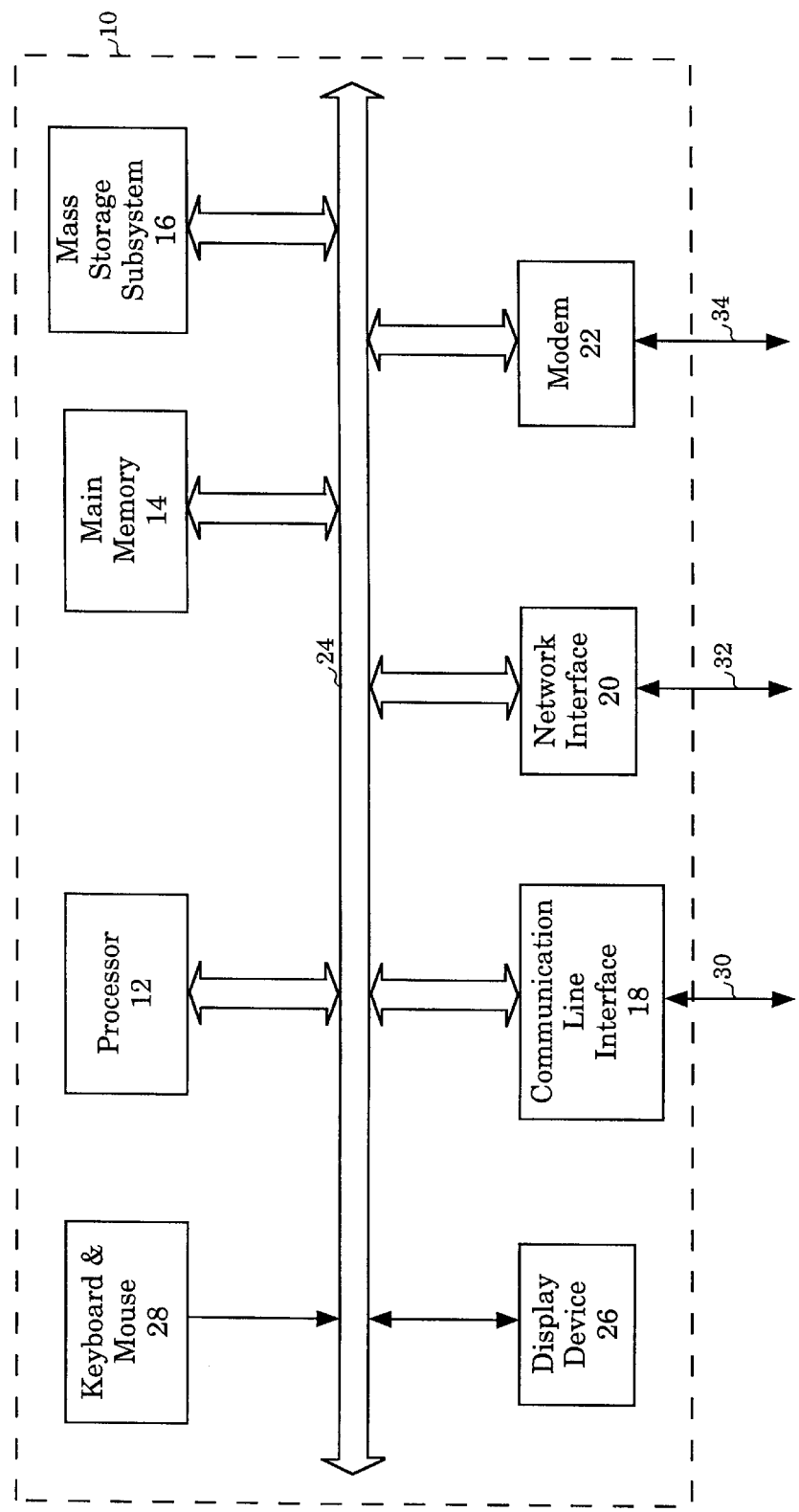
FIG. 1 illustrates a computer system for one embodiment which comprises a processor, a main memory, a mass storage subsystem, a communication line interface, a network interface and a modem.

FIG. 1 illustrates a computer system 10 for one embodiment. The computer system 10 comprises a processor 12, a main memory 14, and a mass storage subsystem 16. The computer system 10 further comprises a communication line interface 18, a network interface 20 and a modem 22. The processor 12, the main memory 14, the mass storage subsystem 16, the communication line interface 18, the network interface 20 and the modem 22 are coupled for communication over a system bus 24.

The main memory 14 provides storage areas for an operating system, a set of application programs including communication application programs and corresponding device driver programs and associated data structures for the computer system 10. The mass storage subsystem 16 provides large scale data and program storage for the computer system 10. The mass storage subsystem 16 provides storage areas for application programs, device driver programs, an operating system as well as databases and associated data structures for the computer system 10.

The communication line interface 18 enables communication over a high speed communication link 30. For one embodiment, the high speed communication link 30 comprises an industry standard data network (ISDN) communication link. The network interface 20 enables local area network (LAN) communication via a communication link 32. For one embodiment, the communication link 32 comprises an ethernet communication link. The modem 22 enables data communications and fax communications over a telephone line 34.

The computer system 10 further comprises a keyboard and mouse 28 and a display device 28. The keyboard and mouse 28 and the display device 28 enables the application programs executing on the computer system 10 to perform user interface functions via input through the keyboard and mouse 28 and output display on the display device 28.

Figure 2:
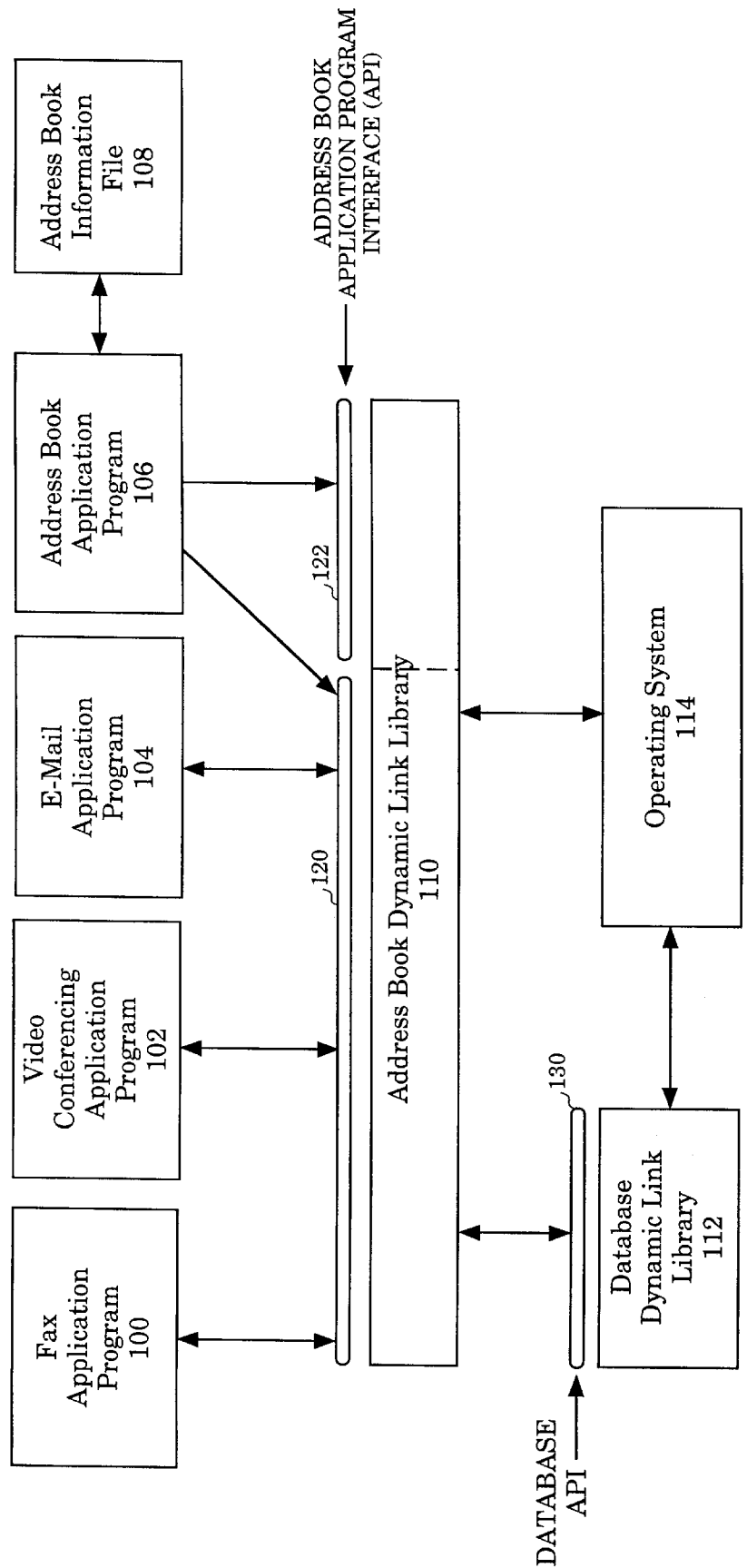
FIG. 2 illustrates software elements implemented on the computer system which comprise a fax application program, a video conferencing application program, an e-mail application program, an address book application program and an address book dynamic link library.

FIG. 2 illustrates software elements implemented on the computer system 10. The software elements of the computer system 10 comprise a set of communication application programs including a fax application program 100, a video conferencing application program 102, and an e-mail application program 104. The software elements of the computer system 10 further comprise an address book application program 106 and an address book dynamic link library (DLL) 110.

The software elements of the computer system 10 also include an operating system 114. For one embodiment, the operating system 114 is a Microsoft Windows operating system that provides communication interfaces between software elements via dynamic link libraries and corresponding application programmers interfaces.

The address book DLL 110 provides address book services to application programs executing on the computer system 10 including the fax application program 100, the video conferencing application program 102 and the e-mail application program 104. The fax application program 100, the video conferencing application program 102 and the e-mail application program 104 each access the address book services of the address book DLL 110 through an address book application programming interface (API) 120. The address book application program 106 also accesses the address book services of the address book DLL 110 through the address book API 120. The fax application program 100, the video conferencing application program 102 and the e-mail application program 104 are referred to as client communication application programs to the address book DLL 110.

The address book DLL 110 also provides notification services to the address book application program 106. The notification services include functions or routines for notifying the client communication application programs of user selection or dialing events entered through the user interface of the address book application program 106. The address book application program 106 invokes the notification services of the address book DLL 100 through an address book notification API 122.

The fax application program 100 performs fax transfers over the telephone line 34 via the modem 22. The fax application program 100 performs dialing and fax handshake functions as well as telephone line hangup functions through the modem 22. The fax application program 100 also implements user interface functions that enable a user to initiate fax transfers and to enter address book information for fax communication. The user interface functions of the fax application program 100 also provides status displays to the user through the display device 26.

The video conferencing application program 102 performs real time video data transfers over the high speed communication link 30 through the communication line interface 18. The video conferencing application program 102 performs video data encoding and decoding functions as well as user interface functions. The user interface functions of the video conferencing application program 102 enable a user to enter address book information including ISDN addresses that specify video conferencing recipients on the communication link 30. The user interface functions of the video conferencing application program 102 include video window displays and status displays on the display device 26.

The e-mail application program 104 performs electronic mail message transfers over the communication link 32 through the network interface 20. The e-mail application program 104 performs user interface functions that enable a user to enter address book information and corresponding e-mail addresses for electronic mail recipients on the communication link 32 local area network. The user interface functions of the e-mail application program 104 also provide status displays to the user on the display device 26.

The address book DLL 110 implements routines or functions for accessing and maintaining an address book database on the mass storage subsystem 16. The address book DLL 110 accesses an address book database on the mass storage subsystem 16 by invoking functions of a database DLL 112. The functions of the database DLL 112 are invoked through a database application programmers interface (API) 130.

The address book application program 106 implements user interface functions that enable a user to select individual destination identifiers from the address book database on the mass storage subsystem 16. The address book application program 106 notifies the appropriate communication application program according to the type of destination identifier selected by the user. The user interface functions of the address book application program 106 also enable a user to enter, edit, and search address book information into the address book database in the mass storage system 16.

The fax application program 100, the video conferencing application program 102 and the e-mail application program 104 each invoke the address book services of the address book DLL 110 through the address book API 120. The address book API 120 enables the client communication application programs to access and update individual records in the address book database on the mass storage subsystem 16. In addition, the address book application program 106 accesses and updates individual records in the address book database on the mass storage subsystem 16 through the address book API 120.

The fax application program 100, the video conferencing application program 102, and the e-mail application program 104 each invoke a register function of the address book DLL 110 to register a corresponding callback function. The callback functions enable the address book DLL 110 to notify the appropriate client communication application program of user selection or dialing events entered the address book application program 106.

The address book DLL 110 implements dial notification routines or functions that invoke the appropriate callback functions of the client communication application programs. The address book application program 106 invokes the dial notification functions through the address book notification API 122 to notify the appropriate client communication application program upon user selection or dialing of a destination identifier in the address book.

For example, the fax application program 100 registers a fax callback function with the address book DLL 110 by invoking the register function of the address book DLL 110 during application program startup. Thereafter, if the user selects or dials a fax destination identifier (i.e., fax number) through the user interface function of the address book application program 106, then the address book application program 106 invokes the dial notification function of the address book DLL 110. The dial notification function in the address book DLL 110 then invokes the fax callback function in the fax application program 100 and provides the selected or dialed destination identifier from the address book database.

The address book application program 106 maintains an address book information file 108. The address book information file 108 contains a default list of default client communication application programs. The default list specifies a default client communication application program for each of a predetermined set of communication types. For one embodiment, the predetermined communication types include fax, video, voice, or e-mail communication types.

For example, the address book information file 108 specifies the fax application program as the default client communication application for the fax communication type. The address book information file 108 specifies the video conferencing application program 102 as the default client communication application program for the video communication type. The address book information file 108 specifies the e-mail application program 104 as the default client communication application for the e-mail communication type.

Figure 3:
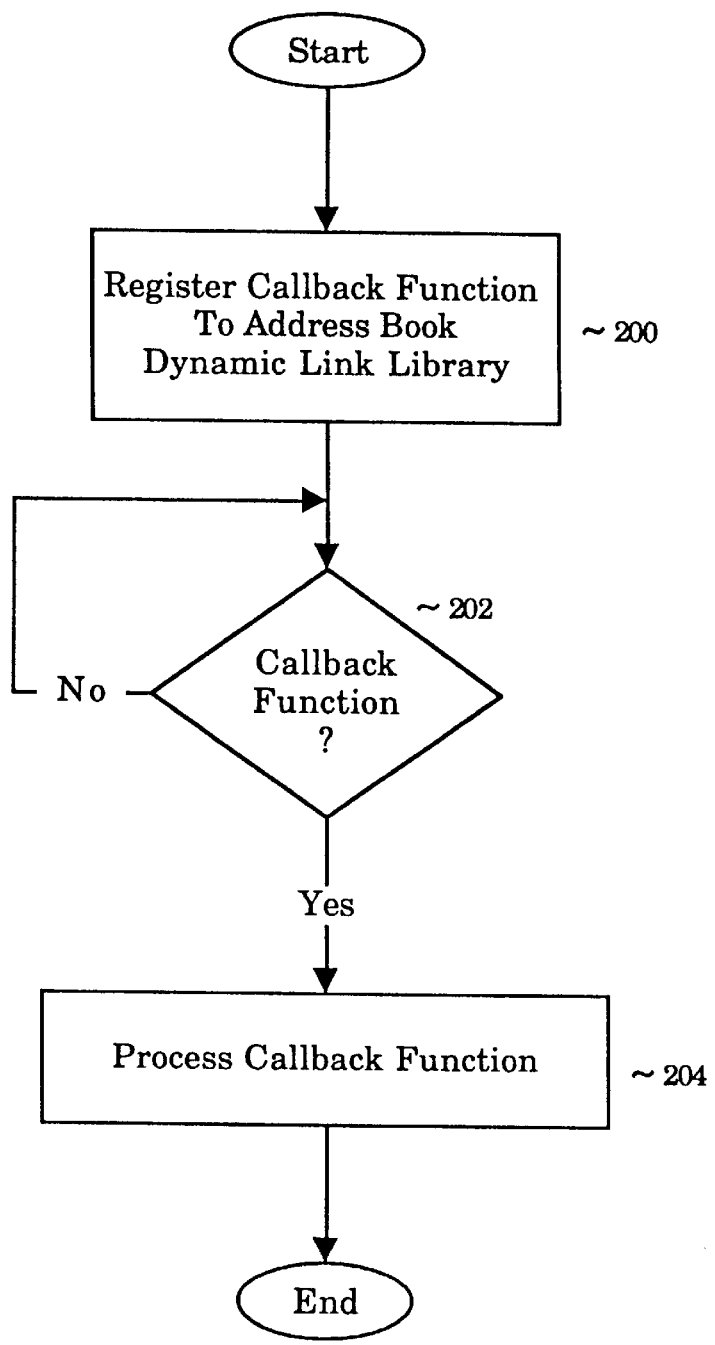
FIG. 3 illustrates an interaction between a client communication application program and the address book DLL.

FIG. 3 illustrates an interaction between a client communication application program and the address book DLL 110. The fax application program 100, the video conferencing application program 102, and the e-mail application program 104 each implement the client application program steps shown.

During start up, the client communication application program registers a callback function 1pfnProc to the address book DLL 110 at block 200. The client communication application program registers the callback function 1pfnProc by invoking the abRegister function call of the address book DLL 110 through the address book API 120. Table 1 illustrates the format of the abRegister function call for one embodiment.

TABLE 1

| | ab Register Function Call | |
|---|---|---|
| Syntax | AB_RETCODE abRegister | ([o]lpwSessionID, [i]wAppType, [i]lpfnProc, [i]lParam, [o]lpwVersionNum) |
| Parameters | LPWORD | lpwsessionID |
| | WORD | wAppType |
| | AB_CALLBACK | lpfnProc |
| | LONG | lParam |
| | LPWORD | lpwVersionNum |
| Return Value | Returns ABRC_SUCCESS if the function was successful. Otherwise one of the following errors are returned: ABRC_INVALCALLBACK ABRC_TYPECONFLICT | |

The 1pwSessionID of the abRegister function call provides a pointer to a memory location for a session identifier (ID). The session ID is provided by the address book DLL 110 and is specified in subsequent function calls by the corresponding client communication application program to the address book DLL 110. The wAppType parameter specifies the type of communication application being registered. For one embodiment, the wAppType parameter specifies one or more of the fax, video, voice, or e-mail communication types. The client communication application program may register as several communication types.

The 1pfnProc parameter specifies the callback function invoked or called by the address book DLL 110 when transferring messages to the corresponding client communication application. The 1Param parameter of the abRegister function call provides a communication application defined value for the callback functions. The 1pwVersionNum parameter of the AB register function call specifies the version number of the address book DLL 110.

Each client communication application program registers with the address book DLL 110 using the abRegister function call. The abRegister function call informs the address book DLL 110 that the requesting client communication application program requires address book services. The registration of client communication application programs enables the address book DLL 110 to notify the proper client communication application program whenever a destination identifier is selected or dialed through the user interface of the address book application program 106. The appropriate client communication application program is inferred by the wAppType parameter provided by registered communication client applications in the corresponding abRegister function call.

The 1pfnProc parameter of the abRegister function call specifies a callback function in the calling client communication application program to process callback messages from the address book DLL 110. The callback messages enable the address book application program 106 to notify the appropriate client communication application program upon user events. The address book application program 106 notifies the address book DLL 110 of a user event through the address book notification API 122. The address book DLL 110 then performs the appropriate callback to the client communication application program according to the user event.

For one embodiment, the callback messages include a ABN_DIAL message which is sent by the address book DLL 110 to the appropriate client communication application program if the user dials a destination identifier from address book records through the user interface of the address book application program 106. The ABN_SELECT and the ABN_DESELECT messages are sent from the address book DLL 110 to the callback function of the appropriate client communication application program if the user selects or deselects a record in the address book database. The address book DLL 110 passes a handle to the callback function of the appropriate client communication application program to enable access to the address book record data.

The ABN_UPDATE message is sent by the address book DLL 110 to the callback function of the appropriate client communication application program if the user updates an address book record through the user interface of the address book application program 106. The ABN_UPDATE message includes a handle that provides the client communication application program access to the updated address book record. The ABN_DELETE message is sent by the address book DLL 110 to the appropriate client communication application program if the user deletes an address book record through the address book application program 106. The address book DLL 110 transfers the ABN_STATE CHANGE message to the callback function of the client communication application program if the user creates, opens or closes an address book database through the user interface function of the address book application program 106.

A client communication application program unregisters from the address book DLL 110 by invoking the abunregister function call through the address book API 120 when the client application communication closes. Table 2 illustrates the format of the abunregister function call for one embodiment.

TABLE 2

| | abUnregister Function Call | |
|---|---|---|
| Syntax | AB_RETCODE abUnregister | ([i]wSessionID, [i]wAppType) |
| Parameters | WORD | wSessionID |
| | WORD | wAppType |
| Return Value | Returns ABRC_SUCCESS if the function was successful. Otherwise one of the following errors are returned: ABRC_INVALCLIENT ABRC_INVALSESSIONID ABRC_NOCLIENT ABRC_NOTFOUND | |

At decision block 202, the video conferencing application program 102 while performing application specific tasks waits for a callback function from the address book DLL 110. The callback function from the address book DLL 110 results from user input through the address book application program 106. If a callback function message is received from the address book DLL 110 at decision block 202 then control proceeds to block 204. At block 204 the video conferencing application program 102 processes the message specified by the callback function from the address book DLL 110.

Figure 4:
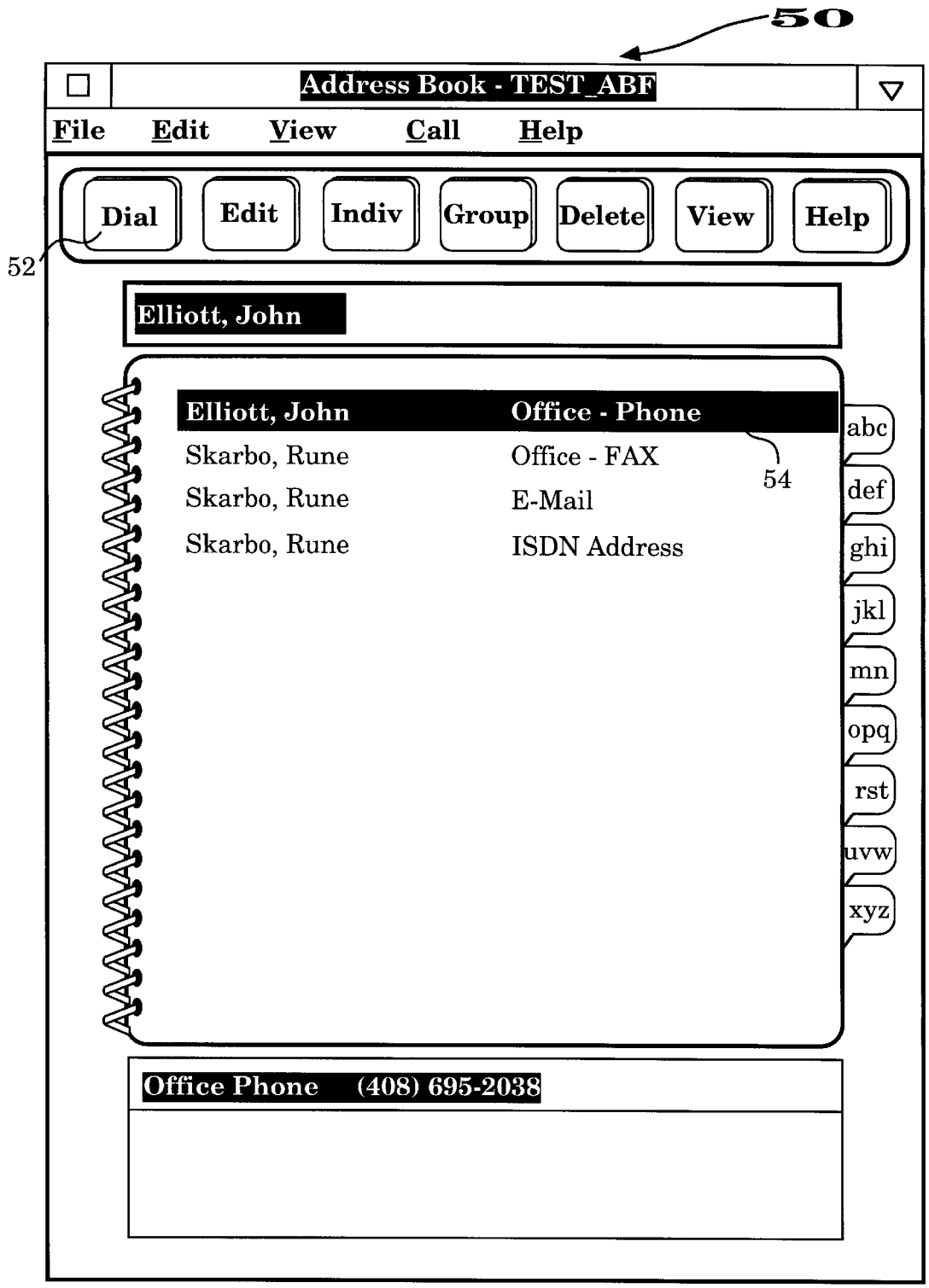
FIG. 4 illustrates a user interface function provided by the address book application program which displays an address book window on the display device and shows an address book entry in the address book database.

FIG. 4 illustrates a user interface function provided by the address book application program 106 for one embodiment. The address book application program 106 displays an address book window 50 on the display device 26. An address book entry in the address book database maintained by the address book application program 106 is highlighted when the user selects the address book entry via the keyboard and mouse 28. For this example, the address book window 50 shows a highlighted address book entry 54.

Each address book entry specifies a communication type. For example, the highlighted address book entry 54 specifies the fax communication type. A dial button 52 enables the user to indicate that the destination identifier specified by the highlighted entry 54 is selected for dialing.

Figure 5:
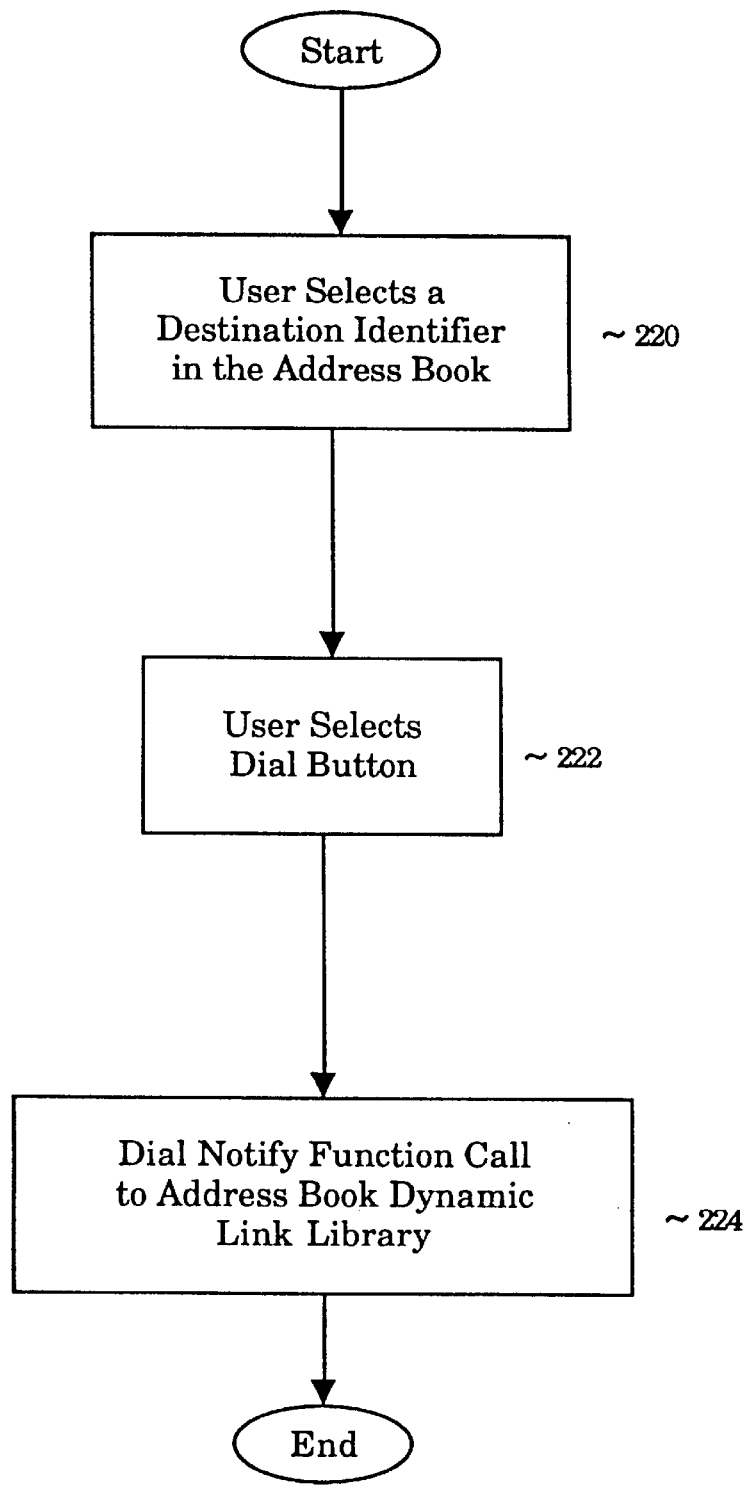
FIG. 5 is a flow diagram that illustrates a user interface function of the address book application program.

FIG. 5 is a flow diagram that illustrates a user interface function of the address book application program 106. At block 220, the user selects an address book entry in the address book 50 via the keyboard and mouse 28. The selected address book entry includes a destination identifier having a corresponding communication type. For example, the address book entry 54 in the address book 50 contains a fax number as the destination identifier and a fax communication type for the specified fax number.

At block 222, the user selects the dial button 52 of the address book 50 using the keyboard and mouse 28. Thereafter, at block 224 the address book application program 106 invokes a dial notify function call to the address book DLL 110 through the address book notification API 122. The dial notify function call to the address book DLL 110 causes the address book DLL 110 to notify the appropriate client communication application program that the user is dialing the specified destination identifier from the address book entry.

Table 3 shows the format of a dial notify function call iabDialNotify to the address book DLL 110 for one embodiment. The address book application program 106 invokes the iabDialNotify function call to the address book DLL 110 through the address book notification API 122.

TABLE 3 iabDialNotify Function Call

| | | |
|---|---|---|
| Syntax | AB_RETCODE | iabDialNotify ([i]wSessionID, [i]hAbRecColl) |
| Parameters | WORD<br>HAB_RECCOLL | wSessionID<br>hAbRecColl |
| Return Value | Returns ABRC_SUCCESS if the function was successful. Otherwise one of the following errors are returned:<br>ABRC_INVALHANDLE<br>ABRC_NOHANDLER<br>ABRC_NOREGISTER<br>ABRC_TIMEOUT<br>ABRC_WINEXEC | |

The wSessionID parameter of the iabDialNotify function call specifies the session ID for the address book application program 106. The hAbRecColl parameter of the iabDialNotify function call specifies the record in the address book database selected by the user through the address book application program 106.

The ABRC_NOHANDLER return value from the iabDialNotify function call indicates that a client communication application was not registered to handle the specified communication type for the destination identifier and a default client communication application program for the specified communication type was not contained in the address book information file 108. The ABRC_NOREGISTER return value from the iabDialNotify function call indicates that the address book DLL 110 encountered a timeout while waiting for registration from the invoked client communication application program specified by the address book information file 108 as the default client.

Table 4 illustrates the format of the iabSelectNotify function call to the address book DLL 110 for one embodiment. The address book application program 106 invokes the iabSelectNotify function call to the address book DLL 110 through the address book notification API 122. The iabSelectNotify function causes the address book DLL 110 to notify all client communication application programs that the user has selected the specified address book entry through the user interface of the address book application program 106.

TABLE 4 iabSelectNotify Function Call

| | | |
|---|---|---|
| Syntax | AB_RETCODE iabSelectNotify | ([i]wSessionID, [i]hAbRec) |
| Parameters | WORD<br>HAB_REC | wSessionID<br>hAbRec |
| Return Value | Returns ABRC_SUCCESS if the function was successful. Otherwise one of the following errors are returned:<br>ABRC_INVALHANDLE<br>ABRC_NOCLIENT | |

The wSessionID parameter of the iabSelectNotify function call specifies the session ID for the address book application program 106. The hAbRecColl parameter of the iabSelectNotify function call specifies the address book record selected by the user through the user interface function of the address book application program 106.

The ABRC_NOCLIENT return value of the iabSelectNotify function call indicates that a client communication application was not registered to handle the specified communication type of destination identifier and a default communication application program for the specified communication type was not found in the address book information file 108.

Table 5 illustrates the format of the iabDeleteNotify function call of the address book DLL 110 for one embodiment. The address book application program 106 invokes the iabDeleteNotify function call through the address book notification API 122. The iabDeleteNotify function notifies all client communication application programs that the specified address book entry has been deleted from the address book via the user interface function of the address book application program 106.

TABLE 5 iabDeleteNotify Function Call

| | | |
|---|---|---|
| Syntax | AB_RETCODE iabDeleteNotify | ([i]wSessionID, [i]hAbRec) |
| Parameters | WORD<br>HAB_REC | wSessionID<br>hAbRec |
| Return Value | Returns ABRC_SUCCESS if the function was successful. Otherwise one of the following errors are returned:<br>ABRC_INVALHANDLE<br>ABRC_NOCLIENT<br>ABRC_NOMEM | |

Table 6 illustrates the format of the iabUpdateNotify function call of the address book DLL 110 for one embodiment. The address book application program 106 invokes the iabUpdateNotify function through the address book notification API 122. The iabUpdateNotify function of the address book DLL 110 notifies all client communication application programs that the specified address book entry has been updated through the user interface function of the address book application program 106.

TABLE 6 iabUpdateNotify Function Call

| | | |
|---|---|---|
| Syntax | AB_RETCODE iabUpdateNotify | ([i]wSessionID, [i]hAbRec) |
| Parameters | WORD<br>HAB_REC | wSessionID<br>hAbRec |
| Return Value | ABRC_SUCCESS if the function was successful. Otherwise one of the following errors are returned:<br>ABRC_INVALHANDLE<br>ABRC_NOCLIENT | |

Figure 6:
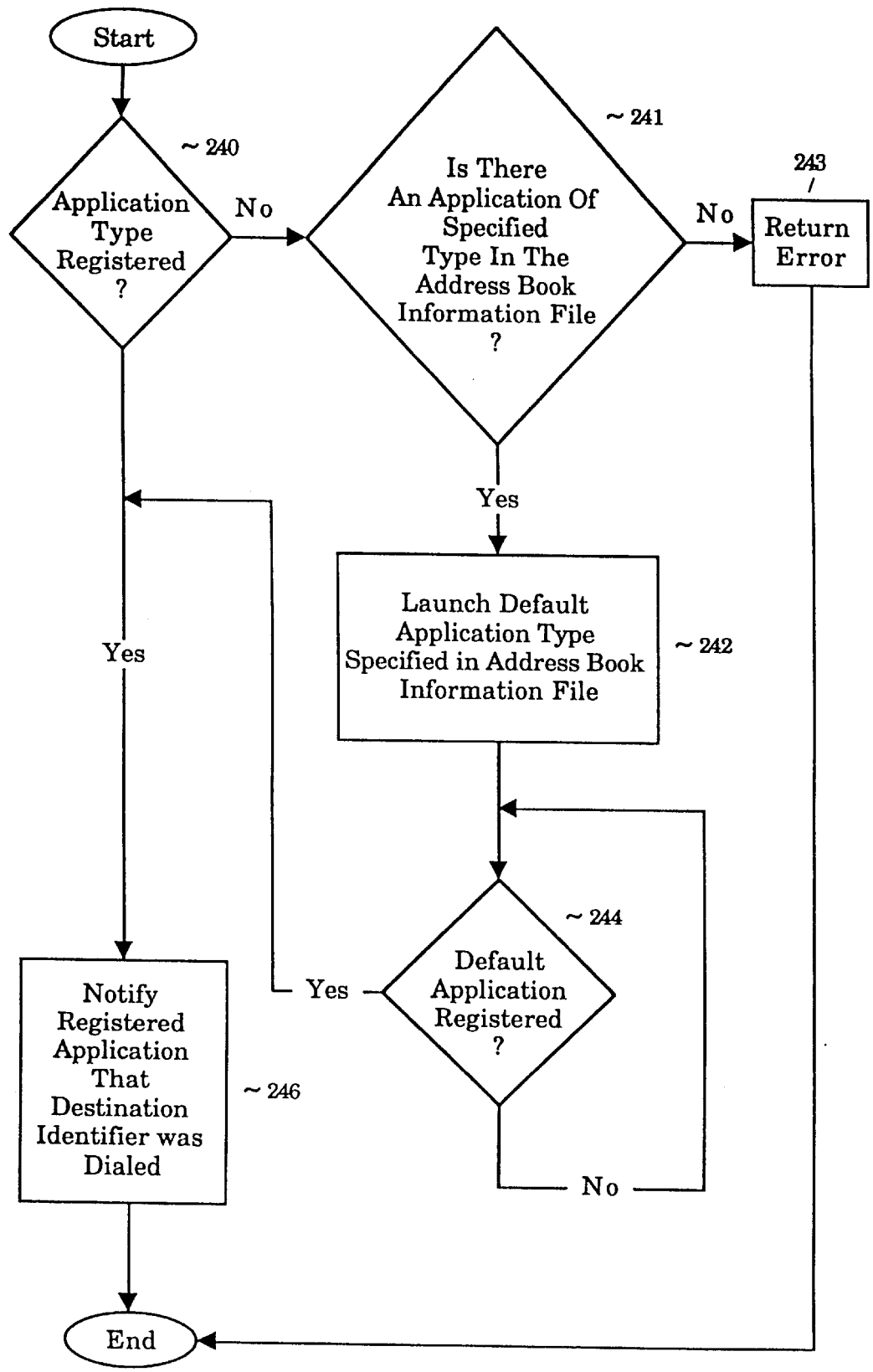
FIG. 6 flow diagram that illustrates the handling of an iabDialNotify function call by the address book DLL.

FIG. 6 is a flow diagram that illustrates the handling of an iabDialNotify function call by the address book DLL 110. At decision block 240, the address book DLL 110 determines whether a client communication application of the communication type specified by the iabDialNotify function call is registered. If a client communication application program of the specified communication type is not registered at decision block 240, then control proceeds to decision block 241. Otherwise, control proceeds to decision block 246 to notify the registered communication application program.

At block 241, the address book DLL 110 determines whether a default communication application program for the communication type is specified in the address book information file 108. If a default communication application program for the communication type is specified in the address book information file 108 at decision block 241, then control proceeds to block 242. Otherwise, an error is returned at block 243.

At block 242, the address book DLL 110 launches the default communication application program for the communication type specified in the address book information file 108. For one embodiment, the address book DLL 110 launches the default client communication application program by invoking a WIN_EXEC function provided by the operating system 114.

Thereafter at decision block 244, the iabDialNotify function call of the address book DLL 110 waits for the launched default client communication application program to register a callback via the abRegister function call to the address book DLL 110. Thereafter control proceeds to block 246.

At block 246 the iabDialNotify function call of the address book DLL 110 notifies the registered client communication application program that the destination identifier specified in the selected address book record was dialed by the user. The iabDialNotify function of the address book DLL 110 notifies the appropriate client communication application program by invoking the registered callback function for the client.

Table 7 illustrates the format of the HAB_REC structure specified by the iabDialNotify function call for one embodiment. The HAB_REC structure is passed to the registered client communication application program via the registered callback function for the appropriate client communication application program.

TABLE 7

| HAB_REC Structure | |
| --- | --- |
| ABFLD_TITLE | title, a string |
| ABFLD_FNAME | first name, a string |
| ABFLD_LNAME | last name, a string |
| ABFLD_FULLNAME | constructed from FNAME, LNAME |
| ABFLD_COMPANY | company, a string |
| ABFLD_POSITION | position, a string |
| ABFLD_ADDRESS | address, a string |
| ABFLD_CITY | city, a string |
| ABFLD_STATE | state, a string |
| ABFLD_ZIP | zip, a string |
| ABFLD_COUNTRY | country, a string |
| ABFLD_NUMBER | up to ABMAX_NUMBERS AB_PHONENUM structures; see AB_PHONENUM |
| ABFLD_NUMINDEX | an AB_PHONENUM; the default number |
| ABFLD_INDEX | the index of the default number; a WORD |
| ABFLD_NOTES | notes, a long string |
| ABFLD_EMAIL | electronic mail address |
| ABFLD_PHOTO | photo |

Table 8 illustrates the format of a registered callback function Ipfnproc for one embodiment. The IpfnProc callback function is specified by the client communication application program when registering via the abRegister function call to the address book DLL 110 through the address book API 120.

TABLE 8

| IpfnProc Callback Function |
| --- |
| The lpfnProc callback is defined as follows: BOOK CALLBACK lpfnProc(UINT uiMsg, WORD wSessionID, DWORD dwParam, LPARAM lParam); where uiMsg is a message that specifies the event (ABN_*), wSessionID is the session ID of the Address Book; dwParam is a HAB_REC and lParam is the data supplied by the Address Book application in the call to iabRegisterAB. |

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. An application programming interface for shared address book services in a computer system, the application programming interface comprising:

a register function call that enables a set of client communication application programs executing on the computer system to each register a callback function with a shared address book service, each client communication application program being associated with a communication type, and the shared address book service including an integrated address file having a plurality of addressees with addresses associated with different communication types; and a notify function call that enables an address book application program executing on the computer system to notify the client communication application program having the communication type, through the shared address book service, that a user has selected an address of an addressee associated with the communication type, wherein the notify function call invokes the callback function of the client communication application program having the communication type, which in turn initiates a communication transaction with the addressee of the selected address using the selected address.

2. The application programming interface of claim 1, wherein the register function calls from the client communication application programs specify the corresponding communication types for the communication application programs.

3. The application programming interface of claim 1, wherein the communication types include all or selected ones of a fax communication type, a voice communication type, a video communication type and an e-mail communication type.

4. The application programming interface of claim 1, wherein the client communication application program maps to a fax communication type, and comprises a fax communication application program, and wherein the selected address comprises a fax number.

5. The application programming interface of claim 1, wherein the client communication application program maps to a video communication type, and comprises a video conferencing application program, and wherein the selected address comprises an address on a high speed communication link.

6. The application programming interface of claim 1, wherein the client communication application program maps to an e-mail communication type, and comprises an e-mail application program, and wherein the selected address comprises an e-mail address on a network.

7. The application programming interface of claim 1, wherein the notify function call enables the address book application program to notify a default client communication program for a default communication type of the integrated address file.

8. A method for sharing address book services for each of a set of client communication application programs in a computer system, the method comprising the steps of:

registering a callback function with a shared address book service for each client communication application program executing on the computer system, each client communication application program servicing one or more of a set of communication types, and the shared address book service including an integrated address file having a plurality of addressees with addresses associated with different communication types;

sensing a user selection through an address book application program wherein the user selection specifies one of said addresses with communication types; and invoking the callback function of the requested client communication application program with a communication type that corresponds to the communication type of the selected address, through the shared address book service, wherein the callback function passes the selected address to the requested client communication application program, initiating a communication transaction with the addressee of the selected address.

9. The method of claim 8, wherein the step of registering a callback function comprises the step of invoking a register function call to an address book service library from each client communication application program such that the register function calls pass the communication types for the client communication application programs.

10. The method of claim 9, wherein the communication types include a fax communication type, a voice communication type, a video communication type, and an e-mail communication type.

11. The method of claim 10, wherein the client communication application program maps to a fax communication type, and comprises a fax communication application program, and wherein the selected address comprises a fax number.

12. The method of claim 10, wherein the client communication application program maps to a video communication types and comprises a video conferencing application program, and wherein the selected address comprises an address on a high speed communication link.

13. The method of claim 10, wherein the client communication application program maps to an e-mail communication type, and comprises an e-mail application program, and wherein the selected address comprises an e-mail address on a network.

14. The method of claim 8, further comprising the step of invoking a default client communication application program for a communication type specified in an address book information file.

15. An apparatus for sharing address book services for each of a set of client communication application programs in a computer system, the apparatus comprising:

means for registering a callback function for each client communication application program executing on the computer system with a shared address book service, each client communication application program servicing one or more of a set of communication types, and the shared address book service including an integrated address file having a plurality of addressees with addresses associated with different communication types;

means for sensing a user selection through an address book application program wherein the user selection specifies one of said addresses with communication types; and means for invoking the callback function of a requested client communication application program with a communication type that corresponds to the communication type of the selected address, through the shared address book service, wherein the callback function passes the selected address to the client communication application program being invoked, which in turn initiates a communication transaction with the addressee of the selected address using the selected address.

16. The apparatus of claim 15, wherein the means for registering a callback function comprises means for invoking a register function call to an address book service library from each client communication application program such that the register function calls pass the communication types for the communication application programs.

17. The apparatus of claim 16, wherein the communication types include a fax communication type, a voice communication type, a video communication type, and an e-mail communication type.

18. The apparatus of claim 18, wherein the client communication application program maps to the fax communication type and comprises a fax communication application programs and wherein the selected address comprises a fax number.

19. The apparatus of claim 17, wherein the client communication application program maps to the video communication type, and comprises a video conferencing application program, and wherein the selected address comprises an address on a high speed communication link.

20. The apparatus of claim 17, wherein the client communication application program maps to the e-mail communication type, and comprises an e-mail application program and wherein the selected address comprises an e-mail address on a network.

21. The apparatus of claim 15, further comprising means for invoking a default client communication application program for a communication type specified in an address book information file.

* * * * *

UNITED STATES PATENT AND TRADEMARK OFFICE
CERTIFICATE OF CORRECTION

PATENT NO. : 5,835,089
DATED : November 10, 1998
INVENTOR(S) : Skarbo et al.

It is certified that error appears in the above-identified patent and that said Letters Patent is hereby corrected as shown below:

Column 14,
Line 40, delete after "of" delete "claim 18" and insert -- claim --17.

Signed and Sealed this

Fourteenth Day of August, 2001

*Attest:*

NICHOLAS P. GODICI
*Attesting Officer*   *Acting Director of the United States Patent and Trademark Office*